United States Patent Office 3,065,161
Patented Nov. 20, 1962

3,065,161
PROCESS FOR THE MANUFACTURE OF CHLORO-SUCCINIC ACID DICHLORIDES
Walter Protzer, Gersthofen, near Augsburg, Germany, assignor to Farbwerke Hoechst Aktiengesellschaft vormals Meister Lucius & Brüning, Frankfurt am Main, Germany, a corporation of Germany
No Drawing. Filed Mar. 1, 1960, Ser. No. 11,985
Claims priority, application Germany Mar. 6, 1959
8 Claims. (Cl. 204—158)

The present invention provides a process for the manufacture of chlorosuccinic acid dichlorides.

Only a few methods of preparing tetrachlorosuccinic acid or the dichloride thereof have hitherto been known. Tetrachlorosuccinic acid forms, for example, when copper powder acts upon trichloroacetic acid, but it has not yet been possible to isolate the tetrachlorosuccinic acid thus obtained in pure form. It is also known to prepare tetrachlorosuccinic acid or tetrachlorosuccinic acid dichloride by the reaction of dichloroacetic acid or dichloroacetyl chloride with diacetyl peroxide and to prepare tetrachlorosuccinic acid dichloride by oxidizing hexachlorobutadiene with oxygen. However, when the aforesaid methods were carried out only very small quantities of the dichloride could be isolated.

Now I have found that chlorinated succinic acid dichlorides, in particular tetrachlorosuccinic acid dichloride, form in a good yield and with a high degree of purity when chlorine which, if desired, may be diluted with other gases, for example hydrogen chloride or inert gases, acts upon dichloroacetyl chloride which is simultaneously exposed to the action of light. The course of the aforesaid reaction was extremely surprising since the action of chlorine on organic compounds with the simultaneous incidence of light is a process which has long been known for introducing chlorine as a substituent into the said compounds and which is applied, for example, in the industry in the chlorination of toluene which leads to the formation of benzyl chloride. Dichloroacetic acid may also be chlorinated in this manner to yield trichloroacetic acid. In contradistinction thereto, when dichloroacetyl chloride is chlorinated under the same reaction conditions it is only to a small extent converted into trichloroacetyl chloride and principally dimerized, with dehydration, to chlorinated succinic acid dichlorides, in particular tetrachlorosuccinic acid dichloride. Instead of dichloroacetyl chloride there may be used as starting material acetyl- or monochloroacetyl chloride which under the reaction conditions is converted in the same manner into chlorinated succinic acid dichlorides, in particular tetrachlorosuccinic acid dichloride.

The present process enables tetrachlorosuccinic acid dichloride to be prepared in technically simple manner from easily accessible and cheap starting materials without the use of diacetyl peroxide which because of its explosive character is difficult to handle and which, besides, in the preparation of tetrachlorosuccinic acid dichloride by the above-mentioned processes has to be used in molar proportions. The tetrachlorosuccinic acid chloride can be converted in known manner into the free acid and into other derivatives, such as esters and amides.

The reaction according to the invention can be carried out in the liquid phase as well as in the gaseous phase, if desired with the application of superatmospheric pressure. When the reaction is carried out in the liquid phase chlorine is, for example, introduced in a finely divided form into the dichloroacetyl chloride while the reaction mixture is simultaneously exposed to the action of light, preferably of light that is rich in rays of short wave length. To the acid chloride there may be added solvents which do not or not considerably react with the reactant. As solvents of this kind there may be mentioned, for example, carbon tetrachloride, chloroform, pentachloroethane, trichloroethylene, tetrachloroethane and other fluorine- or chlorine-containing aliphatic hydrocarbons provided they are liquid under the reaction conditions, for example, 1,1,2-trifluorotrichoroethane, mono- and polychlorobenzenes and nitrobenzene. It is of minor importance whether these solvents are further chlorinated during the reaction. When the reaction is carried out in the gaseous phase the dichloroacetyl chloride vapor is exposed to the action of light rays in the presence of chlorine which is preferably used in an excess and after the condensation of the high-boiling tetrachlorosuccinic acid dichloride the portion of dichloroacetyl chloride that has not undergone conversion is recycled into the reaction vessel together with the excess of chlorine.

The reaction sets in at room temperature already, it is, however, promoted when the temperature is raised. It is, therefore, advantageous to carry out the process at a temperature within the range of 50° to 400° C., preferably 100° to 200° C. The temperature may be constant during the total duration of the reaction or it may be varied. When the reaction is carried out in the liquid phase the temperature may, for example, be gradually increased as the quantity of product converted is increased, so that a continuous reflux takes place. By a good cooling of the waste gas the losses caused by the evaporation of volatile acid chlorides are limited to a minimum. The reaction mixture is distilled in order to be worked up. After the separaton of a small portion of dichloro- or trichloroacetyl chloride the chlorinated succinic acid dichlorides pass over in a yield of 70 to 75%. The degree of chlorination of the final product depends on the quantity of chlorine used and on the reaction conditions, for example the reaction temperature. In general tetrachlorosuccinic acid dichloride will be the desired final product. It is, however, also possible to prepare mixtures containing considerable or predominant portions of less chlorinated products, for example dichlorosuccinic acid dichloride. Alternatively, only the lower boiling portions of the reaction mixture may be eliminated. In this case there is obtained as a residue crude tetrachlorosuccinic acid dichloride which is sufficiently pure for many industrial purposes. The process of the invention may be carried out discontinuously or continuously.

As starting material there may be used dichloroacetyl chloride in pure or crude form. The crude dichloroacetyl chloride obtainable by the action of oxygen on trichloroethylene (cf. German Patent No. 759,963) is inter alia particularly suitable, so that it is possible to combine the very economic process for preparing dichloroacetyl chloride from trichloroethylene with the process of the present invention which is directed to the preparation of tetrachlorosuccinic acid dichloride. Instead of dichloroacetyl chloride monochloroacetyl chloride or a mixture of the two chlorides may be used as starting material in the process of the invention. In this case, too, tetrachlorosuccinic acid dichloride is formed by the chlorination and simultaneous dimerization of the aforesaid acid chloride. As intermediate products there are then obtained succinic acid dichlorides having a lower degree of chlorination, for example dichlorosuccinic acid dichloride. Acetyl chloride or mixtures thereof with mono- and/or dichloroacetyl chloride may also be used as starting material for the process of the invention. In this case there are also formed in a single operation chlorinated succinic acid chlorides, preferably tetrachlorosuccinic acid dichloride, possibly with the intermediate formation of mono- or dichloroacetyl chloride.

The chlorinated succinic acid dichlorides, in particular tetrachlorosuccinic acid dichloride, are very reactive compounds which may inter alia be used for the preparation of plasticizers, for example, for chlorine-containing compounds of high molecular weight, as intermediate products for the preparation of plant protective agents, in the preparation of polycondensation products having an increased flame-resistance, for example polyester resins or polyamides, and for the preparation for additives for lubricants.

The following examples serve to illustrate the invention but they are not intended to limit it thereto:

Example 1

Dichloroacetyl chloride vapor was mixed with chlorine in a molar ratio of 1.6:1 and continuously passed through a reaction vessel of quartz glass which was heated to 160° to 170° C. and simultaneously exposed to light of short wave length. During this operation tetrachlorosuccinic acid dichloride separated out in the reaction vessel as a liquid and the dichloroacetyl chloride that had not undergone conversion left the reaction vessel in the gaseous state together with trichloroacetyl chloride, hydrogen chloride and the excess of chlorine and passed through a condenser in which dichloro- and trichloroacetyl chloride condensed. The tetrachlorosuccinic acid dichloride thus obtained contained small quantities of trichloroacetyl chloride which could easily be removed by distillation. 646 grams of dichloroacetyl chloride yielded 410 grams of tetrachlorosuccinic acid dichloride (boiling point under a pressure of 10 mm. of mercury 99 to 102° C.) and 150 grams of trichloroacetyl chloride (boiling point 115 to 117° C.).

Example 2

In a reaction vessel provided with an internal thermometer, a stirrer, a gas inlet pipe and a reflux condenser of a good efficiency, 400 grams of dichloroacetyl chloride were heated until they gently boiled and chlorine was introduced in a slow current while the whole was exposed to the action of light of short wave length. In order to avoid losses of dichloroacetyl chloride by evaporation the reflux condenser was charged in one case with ice water and in another case with cooling brine. The temperature was slowly raised during the reaction, so that constantly a small reflux took place. After a reaction period of 40 hours—in one case in which the action of light was strong it was even earlier—the crude product was distilled. After the first runnings which consisted chiefly of dichloroacetyl chloride and trichloroacetyl chloride, tetrachlorosuccinic acid dichloride distilled over at 90° to 92° C. under a pressure of 7 mm. of mercury. The yield amounted to 296 grams, which corresponds to 94% of the theoretical yield.

Example 3

A solution of 200 grams of dichloroacetyl chloride in 200 grams of carbon tetrachloride was heated to 80° C. and chlorine was passed through in a slow current for 72 hours while the whole was exposed to the action of light of short wave length. The distillation of the crude product yielded 141 grams of tetrachlorosuccinic acid dichloride.

Example 4

300 grams of monochloroacetyl chloride were heated until they gently boiled and they were treated for 96 hours with chlorine while exposed to the action of light of short wave length. The distillation of the crude product yielded 218 grams of tetrachlorosuccinic acid dichloride.

Example 5

In the apparatus described in Example 2, chlorine was slowly introduced into 300 grams of acetyl chloride while the whole was exposed to the light of an ultraviolet lamp. The temperature was adjusted and varied in such a manner that there was constantly a small reflux. After a reaction of 5 days the chlorination mixture was distilled whereby 335 grams of tetrachlorosuccinic acid dichloride were obtained.

Example 6

In the manner described in Example 1, dichloroacetyl chloride vapor was continuously passed under a pressure of 0.8 atmosphere (gage) through a reaction vessel of quartz glass which was heated to 170° to 175° C. and exposed to the action of light of short wave length. 575 grams of dichloroacetyl chloride yielded 358 grams of tetrachlorosuccinic acid dichloride.

Example 7

In the apparatus described in Example 2, chlorine was introduced at room temperature (20° C.) into 500 grams of dichloroacetyl chloride while the whole was exposed to ultraviolet light. After a reaction of 5 days the working up by distillation yielded 135 grams of tetrachlorosuccinic acid dichloride in addition to starting material that had not undergone conversion.

Example 8

A slow current of chlorine was introduced within 48 hours at a temperature within the range of 105° to 117° C. into 200 grams of monochloroacetyl chloride while the while was exposed to the light of an ultraviolet dipping lamp. When the reaction mixture was worked up by distillation, there were obtained, in addition to dichloroacetyl chloride, 76 grams of dichlorosuccinic acid dichloride (boiling point 74° to 78° C. under a pressure of 8 millimeters of mercury) and 54 grams of tetrachlorosuccinic acid dichloride.

I claim:

1. The process for the manufacture of chlorosuccinic acid dichlorides with four to six chlorine atoms, which consists essentially of contacting a member selected from the group consisting of acetylchloride, monochloroacetyl chloride, dichloroacetyl chloride and mixtures thereof with chlorine under irradiation with actinic light.

2. A process as claimed in claim 1, wherein the reaction is carried out in the liquid phase.

3. A process as claimed in claim 1, wherein the reaction is carried out in the gaseous phase.

4. A process as claimed in claim 1, wherein the chlorination process is carried out at a temperature between 20° and 400° C.

5. A process as claimed in claim 1, wherein the chlorination process is carried out at a temperature between 100° and 200° C.

6. A process as claimed in claim 1, wherein the chlorination is carried out in the presence of inert solvents.

7. A process as claimed in claim 1, wherein a halogenated aliphatic hydrocarbon is used as solvent.

8. A process as claimed in claim 1, wherein the reaction is carried out under superatmospheric pressure.

References Cited in the file of this patent

UNITED STATES PATENTS 1,993,713   Bass et al. _____ Mar. 5, 1935

OTHER REFERENCES

Ellis et al.: The Chemical Action of Ultraviolet Rays (1941), page 540.